United States Patent [19]
Pilon et al.

[11] 3,831,701
[45] Aug. 27, 1974

[54] POWER STEERING GEAR ACTUATOR

[75] Inventors: Howard M. Pilon, Allen Park; Sven W. Sattavara, Detroit; Michael M. Schechter, Oak Park, all of Mich.

[73] Assignee: Ford Motor Company, Dearborn, Mich.

[22] Filed: Dec. 7, 1972

[21] Appl. No.: 312,995

[52] U.S. Cl. ............................. 180/79.2 R, 91/367
[51] Int. Cl. ........................................... B62d 5/06
[58] Field of Search ............ 180/79.2 R; 74/388 PS; 91/367

[56] References Cited
UNITED STATES PATENTS

| | | | |
|---|---|---|---|
| 3,085,645 | 4/1963 | Bookout | 180/79.2 R |
| 3,552,517 | 1/1971 | Nordeen | 180/79.2 R |

*Primary Examiner*—David Schonberg
*Assistant Examiner*—John A. Pekar
*Attorney, Agent, or Firm*—Clifford L. Sadler; Keith L. Zerschling

[57] ABSTRACT

This disclosure relates to a power steering gear, and more particularly to a gear actuator constructed to be controlled both manually and by a source responsive to an external condition such as the lateral force produced upon a vehicle by a cross wind. In accordance with one embodiment, a steering gear actuator has first and second planetary gear sets with an input shaft connected to the sun gear of the first set. The ring gear of the first set is coupled to a power steering valve. The planet gears of the first set are coupled to the planet gears of the second set. An output shaft is connected to both the sun gear of the second set and the ball nut of a power boosted steering gear. An electric motor has a worm gear engaging the ring gear of the second set. The motor is adapted to be actuated by an external system such as a system constructed to produce a signal in response to a lateral force upon the vehicle resulting from a cross wind. Thus, in this embodiment a steering gear actuator is provided having both a manual input and a system operated input. The two planetary gear sets move in response to the two inputs and provide a composite output for actuating the steering gear.

8 Claims, 4 Drawing Figures

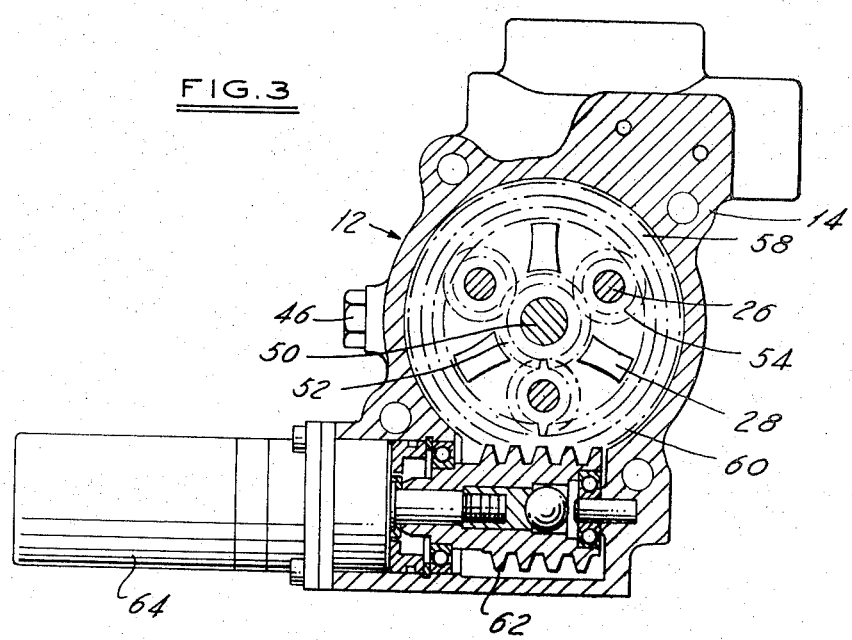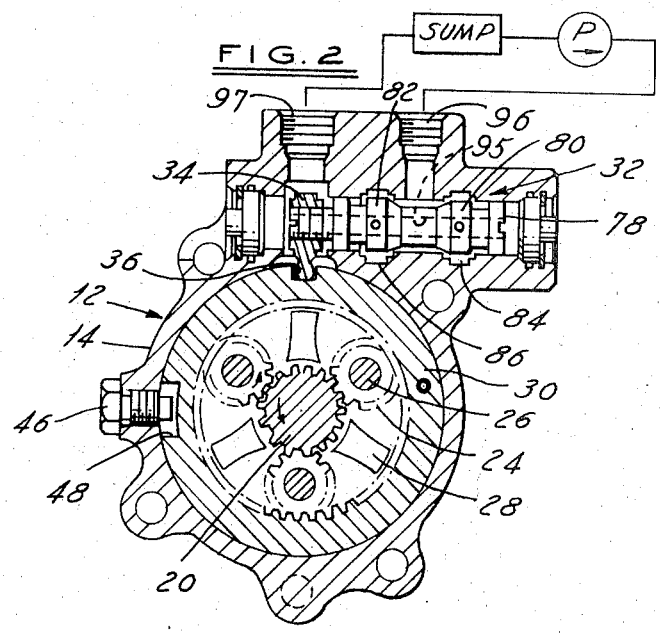

POWER STEERING GEAR ACTUATOR

BACKGROUND OF THE DISCLOSURE

This disclosure relates to steering systems for vehicles which are constructed to be under manual as well as automatic or remote control. In a conventional steering system, the driver controls the path of an automotive vehicle by changing the steering wheel angle and, thus, changing the dirigible wheel angles. In some special cases, the steering mechanism is required to be under the automatic control of an auxiliary control system as well as the manual control of the driver. The purpose of such an auxiliary system may be to make corrections of external disturbances or to control the path of the vehicle in accordance with a signal received from an outside or remote control source.

The principal object of the present invention, therefore, is to provide a steering gear actuator constructed to receive two input control signals (one of which may be a conventional manual input) and to provide a composite output displacement that actuates a steering gear.

BRIEF SUMMARY OF THE DISCLOSURE

Dual control of a steering gear can be accomplished by means of a device capable of receiving two input displacements and producing an output displacement which is, in effect, equal to the sum of the two input displacements. As a component of the steering system, the device can simultaneously receive two displacements (one from the driver and another from the auxiliary system) and transmit to the steering gear a displacement which is a composite of the two input displacements. An example of such a device which is particularly suitable for power steering systems is described below.

An actuator for a power steering gear constructed in accordance with this invention may include first and second planetary gear sets. A manually controlled input shaft is connected to a sun gear of the first set and it, in turn, is in meshed engagement with the planet gears of the same set. The ring gear of the first set is coupled with a power steering valve. The planet gears of the first set are coupled to the planet gears of the second set. An electric motor has a worm gear that engages external gear teeth on the ring gear of the second planetary gear set. An output shaft has a sun gear at one end in meshing engagement with the planet gears of the second set. The other end of the output shaft is provided with a worm that engages the ball nut of a power boostered steering gear.

With this system, displacement of the output shaft is controlled by the displacement of the manually controlled input shaft and by the displacement of the ring gear of the second gear set as produced by the electric motor. The electric motor is constructed to be controlled by an auxiliary system that senses an external condition such as the lateral force caused by a cross wind or a remote control device. Displacement of the ring gear of the first set, caused either by rotation of the input shaft or by rotation of the ring gear of the second set under the effects of the electric motor, will produce displacement of the power steering valve. Valve displacement will direct fluid to one side or the other of the piston situated within the power boosted steering gear.

A power steering gear actuator in accordance with this invention has the advantage that it may be actuated by the input shaft, by the remotely controlled electric motor or both. The output shaft is displaced in an amount equal to the sum of the displacements (negative or positive as the case may be) of the two inputs.

BRIEF DESCRIPTION OF THE DRAWINGS

The many objects and advantages of a steering gear actuator constructed in accordance with this invention will become apparent upon consideration of the following description and the accompanying drawings, in which:

FIG. 2 is a sectional view of the steering gear actuator taken along section line 2—2 of FIG. 1;

FIG. 3 is a sectional view of the steering gear actuator taken along section line 3—3 of FIG. 1.

DETAILED DESCRIPTION OF THE PREFERRED EMBODIMENT

Figure 1:
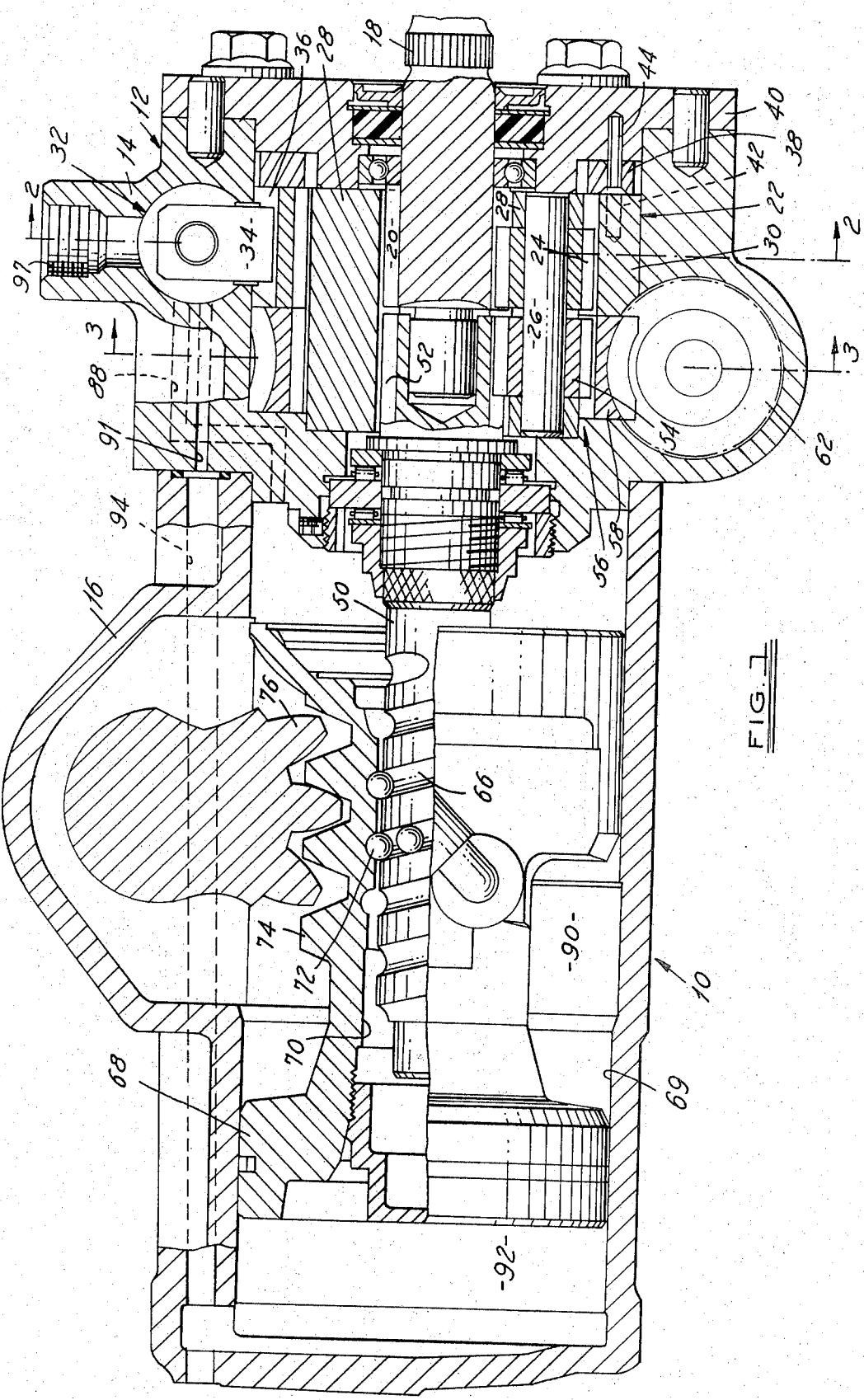
FIG. 1 is a side elevational view, partly in section, of a power steering gear and steering gear actuator constructed in accordance with this invention.
Figure 4:
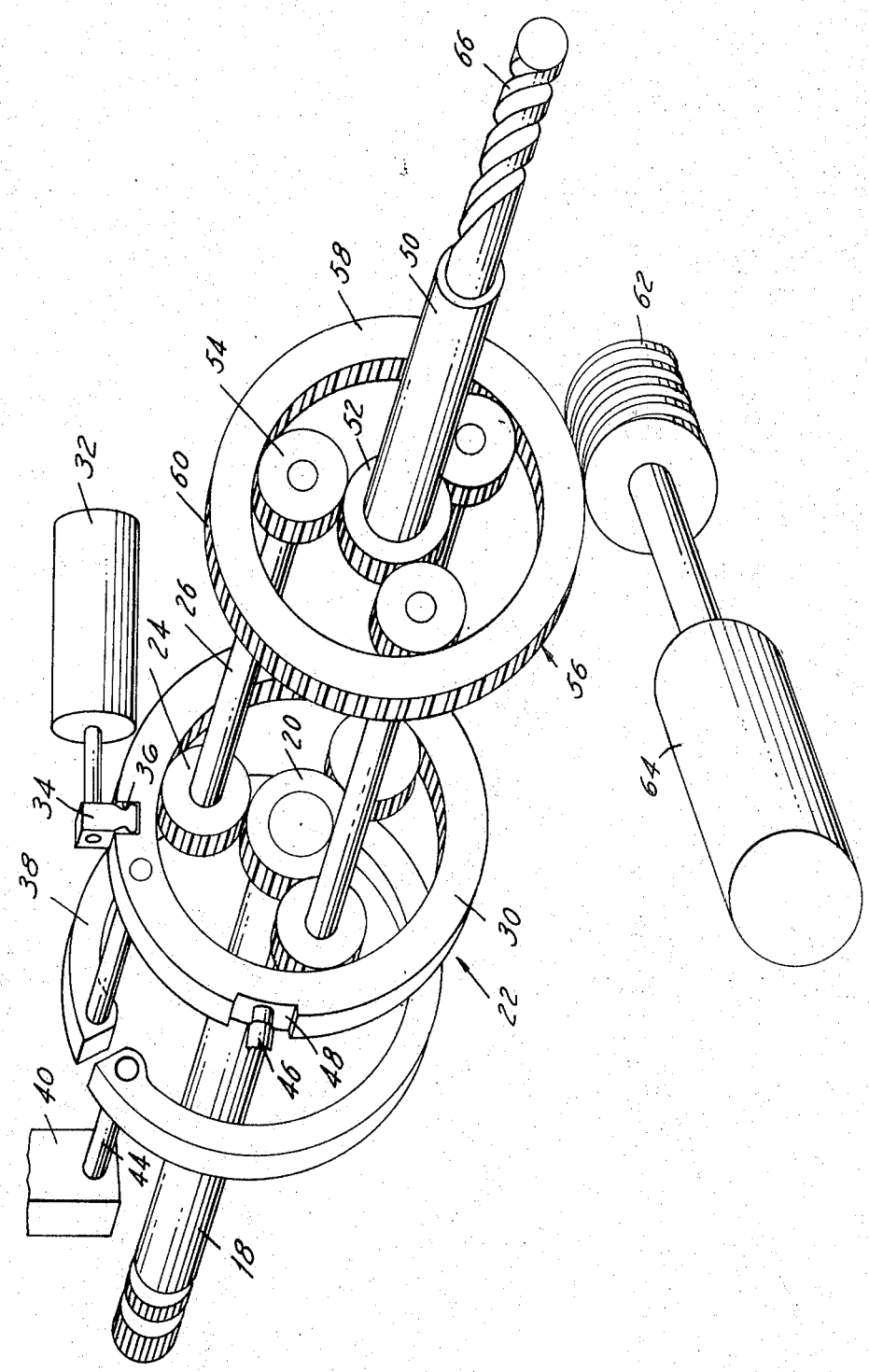
FIG. 4 is a perspective schematic representation of the steering gear actuator of FIG. 1.

Referring now to the drawings, wherein the presently preferred embodiment of this invention is shown, FIG. 1 illustrates a power boosted steering gear 10 and a steering gear actuator 12. The steering gear actuator 12 is enclosed in a housing 14 which is bolted to a housing 16 for the steering gear mechanism 10.

One end of an input shaft 18 is integrally formed with a sun gear 20 of a first planetary gear set 22. The sun gear 20 is in meshed engagement with three planet gears 24, each rotatably mounted on a shaft 26 that is supported by a planet gear carrier 28. The planet gears 24 of the first planetary gear set 22 are meshed with a ring gear 30. The ring gear 30 is connected to a spool type power steering valve 32 by means of a finger 34 engaged in a slot 36 in the outer surface of the ring gear 30. The operation of the power steering valve 32 will be described later.

A C-shape spring 38 is operatively interposed between the ring gear 30 and a cover 40 that is bolted to the housing 14. One end of the C-shape spring 38 is pinned at 42 to the ring gear while the other end is pinned at 44 to the cover 40.

A set screw 46, the end of which enters a slot 48 in the periphery of the ring gear 30, limits the angular displacement of the ring gear 30.

An output shaft 50 of the steering gear actuator 12 has a sun gear 52 meshed with three planet gears 54 of a second planetary gear set 56. The planet gears 54 of the second gear set are rotatably mounted on the same shafts 26 which support the planet gears 24 of the first planetary gear set 22. The planet gears 54 of the second gear set 56 are meshed with a second ring gear 58.

The outer surface of the ring gear 58 of the second gear set 56 is formed with a worm gear 60 that is meshed with a worm gear 62 which, in turn, is driven by an electric motor 64. The helix angle of the worm 62 is such that the gears 60 and 62 provide a self-locking feature, that is, the worm 62 can drive the worm gear 60 but the worm gear 60 cannot drive the worm 62.

The output shaft 50 has a worm portion 66 which forms a part of the power boosted steering gear 16. A power assist piston 68 is in slidable sealed engagement with the cylindrical wall 69 of element 78 of the power steering valve 32 remains in a displaced position as The piston 68 has an internal bore 70 for receiving the worm 66 of the shaft 50. The power piston 68 and the worm 66 are coupled through a standard recirculating ball nut arrangement 72 that converts rotary motion of the worm 66 of the shaft 50 into axial or reciprocatory motion of the piston 68 and vice versa. The power piston 68 has a gear rack 74 formed thereon that engages a sector gear 76 which, in turn, is formed integrally with a power steering bear output shaft (not shown). The power steering output shaft is coupled to the steerable road wheels of the vehicle through said standard linkage mechanism.

A spool type power steering valve assembly 32 is in fluid circuit with a sump and a power steering pump as indicated in FIG. 2. The power steering valve 32 is of the open center type and has a spool type valve element 78 that is slidable in a transverse bore of the housing 14. The valve spool 78 has a central neck portion disposed between lands 80 and 82. The lands 80 and 82 are normally disposed in alignment with annular cavities 84 and 86 in the housing 14. The annular cavity 84 communicates through passage 88 in housing 14 with a chamber 90 situated on the right-hand side of the power piston 68 (see FIG. 1). Passage 91 in the gear actuator housing 14 and passage 94 in the gear housing 16 provide communication between the chamber 92 situated on the left side of power piston 68 and the annular cavity 86 of the power steering valve 32.

The valve spool 78 has an axial bore 95 and radial drain ports communicating with the axial bore 95 that are situated outwardly of the lands 80 and 82 for the purposes which will be described.

OPERATION OF THE HYDRAULIC SYSTEM

Hydraulic fluid is delivered from the pump through a supply port 96 to the area between the valve lands 80 and 82. When the spool valve element 78 is in the neutral position of FIG. 2, the central neck is located midway between the annular cavities 84 and 86. As long as the valve element 78 remains in this position, the fluid delivered to the area of the neck is divided into two flow paths that pass around the edges of the lands 82 and 88, through the annular cavities 84 and 86, through the radial ports in the valve element 78 to the central bore 95 and out a drain port 97 to the sump.

Should the valve element 78 be displaced from the neutral position, one of the annular cavities 84 or 86 will be sealed off from the sump by one of the lands 80 or 82 while the other cavity is cut off from the pump. In that case, fluid from the pump will be directed through the one annular cavity to either power chamber 90 or power chamber 92 depending upon the direction in which the valve 78 was displaced. The pressure fluid directed to chamber 90 or 92 will cause the piston 68 to be displaced, with the fluid on the unpressurized side of the piston 68 being returned through its annular cavity 84 or 86, to the outlet port 97 and the sump.

The piston 68 and the worm 66 of the output shaft 50 act as nut and screw, respectively, so that translatory motion of the piston 68 caused by fluid pressure in chamber 90 or 92 causes the output shaft 50 to rotate.

When the driver rotates the steering wheel and the manual input shaft 18, the ring gear 58 of the second gear set 56 will not be rotated due to the self-locking feature of the worm gears 60 and 62. When the electric motor 64 drive the worm 62 and the second ring gear 58, transmission of this motor to the input shaft 18 must be prevented. This can be done either by the driver providing the necessary reaction force, or by means of a special mechanical device such as a one one-way clutch. If the steering system is under automatic remote control, the input shaft 18 can be mechanically locked.

OPERATION UNDER MANUAL CONTROL

When the input shaft 18 is turned manually, the ring gear 30 overcomes the resistance of the C-shape spring 38 and rotates a few degrees in the opposite direction. Angular displacement of the ring gear 30 displaces the spool valve element 78 from its neutral position and actuates the hydraulic system. As the piston 68 in the power boosted steering gear 10 begins to move under the pressure of fluid in chamber 90 or 92, the output shaft 50 begins to rotate in the same direction and with the same speed as the input shaft 18. Since the ring gear 58 of the second planetary gear set cannot be turned due to the self-locking engagement of the worm gears 60 and 62, rotation of the output shaft 50 causes the planet gear carrier 28 to rotate.

The combined effect of the rotation of the input and output shafts 18 and 50, and the carrier 28 is that the ring gear 30 of the first gear set 22 stops rotating and the valve element position as long as the input shaft 18 is rotated. When the driver stops rotating the input shaft 18, additional rotation of the output shaft 50 caused by fluid pressure on the piston 68 brings the ring bear 30 of the first gear set and the valve element 78 back to the neutral position and the movement of the power piston 68 and the output shaft 50 comes to a halt.

If for some reason the hydraulic system fails to operate, rotation of the input shaft 18 causes the ring gear 30 to rotate until it is stopped by the set screw 46. Then the planet carrier 28 begins to rotate causing rotation of the output shaft 50. Rotation of the output shaft 50 results in translatory motion of the power piston 68, the rack 74 and the sector gear 76. Thus, rotation of the input shaft 18 is mechanically translated through the steering gear actuator 12 and the steering gear 10 to the steering gear output for full manual actuation when there is no fluid pressure.

OPERATION UNDER AUXILIARY SYSTEM CONTROL

When the motor 64 is actuated by a signal from an auxiliary source, the worm 62 drives the ring gear 58 of the second planetary gear set 56. Rotation of the second ring gear 58 causes the planet carrier 28 to rotate and since the driver is assumed to prevent rotation of the input shaft 18, the ring gear 30 of the first gear set begins to rotate in the same direction and with the same speed as the ring gear 58 of the second set, thereby displacing the power steering valve element 78 from its neutral position. As the hydraulic system is actuated in response to valve displacement, the power piston 64 and the steering gear begin to move causing rotation of the output shaft 50. The combined effect of the rotation of the second ring gear 58 and the output shaft 50 is that the planet carrier 28 and the first ring gear 30 stop rotating and the power steering valve element 78 remains in a displaced position as long as the second ring gear 58 is rotated.

When the motor 64 stops rotating the worm 62, additional rotation of the output shaft 40 caused by fluid pressure on the piston 68 brings the first ring gear 30 and the valve element 78 back to neutral position. With the valve element 78 in its neutral position, the movement of the piston 68 and the output shaft 50 will come to a halt.

OPERATION UNDER BOTH MANUAL AND AUXILIARY SYSTEM CONTROL

The foregoing description presents two separate operating situations: (1) manual input to the shaft 18 with the worm 62 remaining stationary, and (2) input from the motor 64 to the worm 62 with the input shaft 18 remaining stationary. It is obvious, however, that the actuator 12 can receive separate inputs from the shaft 18 and the motor 62 simultaneously. In that case, displacement of the output shaft 50 and of the power piston 68 in the steering gear 10 is a composite of the two displacements induced by the two inputs.

The foregoing description presents the presently preferred embodiment of this invention. Modifications and alterations may occur to those skilled in the art that will come within the scope and spirit of the following claims.

We claim:

1. A steering gear actuator constructed to actuate a hydraulic power steering gear unit comprising:
   first and second planetary gear sets,
   each of said sets comprising a sun gear, a ring gear and a planet gear operatively interposed between said sun gear and said ring gear,
   a manually controlled input shaft connected to said sun gear of said first set,
   resilient means constructed to resiliently resist angular displacement of said ring gear of said first set, output shaft means connected to said sun gear of said second set,
   said output shaft means being constructed to be connected to a power steering gear,
   a planet carrier,
   said planet gears of said first and second gear sets being coaxially arranged and supported by said planet carrier,
   auxiliary input means constructed to rotate said ring gear of said second set,
   said ring gear of said first set being constructed to be displaced in response to the displacement of either said manual input shaft or said auxiliary input means,
   power steering valve means constructed to sense displacement of said ring gear of said first set and to direct hydraulic fluid to said power steering gear in response to said displacement of said ring gear of said first set.

2. A steering gear actuator according to claim 1 and including:
   means constructed to limit the angular displacement of said ring gear of said first set.

3. A steering gear actuator according to claim 2 and including:
   means constructed to limit the angular displacement of said ring gear of said second set when said auxiliary input means is inactive.

4. A steering gear actuator according to claim 1 and including:
   means constructed to limit the angular displacement of said ring gear of second set when said auxiliary input means is inactive.

5. A steering gear actuator according to claim 1 and including:
   said auxiliary input means including a motor,
   worm gear drive means interconnecting said motor and said ring gear of said second gear set.

6. A steering gear actuator according to claim 1 and including:
   said auxiliary input means including a motor,
   worm gear drive means interconnecting said motor and said ring gear of said second gear set,
   said worm gear drive means being constructed to transfer motion from said motor to said ring gear of said second gear set,
   said worm gear drive means being constructed to prevent the rotation of said ring gear of said second set when said motor is inactive.

7. A steering mechanism for a motor vehicle comprising:
   a power boosted steering power gear having input means and output means,
   a steering gear actuator operatively connected to said power steering gear,
   said steering gear actuator including first and second planetary gear sets,
   each of said gear sets comprising a sun gear, a ring gear and a planet gear operatively interposed between said sun gear and said ring gear,
   a manually controlled input shaft connected to said sun gear of said first set,
   resilient means constructed to resiliently resist angular displacement of said ring gear of said first set, stop means constructed to limit the angular displacement of said ring gear of said first set,
   power steering valve means constructed to sense displacement of said ring gear of said first set,
   actuator output shaft means connected to said sun gear of said second set,
   said output shaft means being connected to said input means of said power steering gear,
   means supporting said planet gears for rotation about a common axis,
   auxiliary input means constructed to rotate said ring gear of said second set,
   hydraulic assist means connected to said output means of said gear and to said power steering valve means,
   said ring gear of said first set being constructed to be angularly displaced in response to the displacement of both said manual input shaft and said auxiliary input means,
   said power steering valve being constructed to direct hydraulic pressure fluid to said hydraulic assist means in response to the displacement of said ring gear of said first set.

8. A steering gear actuator according to claim 7 and including:
   means constructed to limit the angular displacement of said ring gear of said second set when said auxiliary input means is inactive.

* * * * *